(12) United States Patent
Veeraraghavan et al.

(10) Patent No.: US 12,179,833 B2
(45) Date of Patent: Dec. 31, 2024

(54) STEERING APPARATUS AND METHOD OF OPERATING THE SAME

(71) Applicant: HL MANDO CORPORATION, Gyeonggi-do (KR)

(72) Inventors: Dinesh Veeraraghavan, Karnataka (IN); Prakash Anbazhagan, Karnataka (IN); Vaadi Vijaya Kumar, Karnataka (IN); Preetham Mohandas Banjan, Karnataka (IN); Venkateshwara Rao Pechetti, Karnataka (IN)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/223,003

(22) Filed: Jul. 17, 2023

(65) Prior Publication Data

US 2024/0326897 A1 Oct. 3, 2024

(30) Foreign Application Priority Data

Mar. 31, 2023 (KR) .......................... 10-2023-0043110

(51) Int. Cl.
*B62D 1/187* (2006.01)
(52) U.S. Cl.
CPC .................... *B62D 1/187* (2013.01)
(58) Field of Classification Search
CPC .......... B62D 1/18; B62D 1/183; B62D 1/184; B62D 1/185; B62D 1/187; B62D 1/19;
(Continued)

(56) References Cited

U.S. PATENT DOCUMENTS 10,894,558 B2    1/2021  Suzuki et al.
2005/0263997 A1* 12/2005 Tokioka ..................... F16F 7/12
                                                          280/777
(Continued)

FOREIGN PATENT DOCUMENTS

CN      113715897 A  * 11/2021
DE  112019001618 T5  * 12/2020  ............... B62D 1/18
(Continued)

*Primary Examiner* — Jason D Shanske
*Assistant Examiner* — Daniel M. Keck
(74) *Attorney, Agent, or Firm* — WOMBLE BOND DICKINSON (US) LLP

(57) ABSTRACT

Disclosed is a steering apparatus including a pair of plate brackets provided on two sides of an outer tube and including tilt long holes formed in a vertical direction, a cam unit coupled to an outer side of any one of the pair of plate brackets to apply a pressure inward, and an adjusting unit coupled to an outer surface of the cam unit to adjust rotation of the cam unit, wherein the adjusting unit includes a first spring installed outside the cam unit, a plunger of which one end is in contact with the first spring and the other end is provided with a push button, a stopper provided in a hollow shape through which the plunger passes, a position of the stopper is fixed to a vehicle body, a guide pin formed to protrude from an outer circumferential surface of the plunger, and a guide member provided in a hollow shape through which the plunger passes, fixed to an outer side of the stopper, and including a guide groove in which the guide pin is accommodated, and the guide groove includes a diagonal groove formed in a diagonal direction so that the guide pin moves to rotate the plunger.

15 Claims, 5 Drawing Sheets

(58) Field of Classification Search
CPC ........ B62D 1/192; B62D 1/197; B62D 1/195; F16F 15/06
USPC ...................... 70/182, 252; 74/492, 493, 495
See application file for complete search history.

(56) References Cited

U.S. PATENT DOCUMENTS

| | | | |
|---|---|---|---|
| 2012/0187669 A1* | 7/2012 | Minamigata ........... | B62D 1/195 |
| | | | 280/777 |
| 2013/0228032 A1* | 9/2013 | Okada .................... | B62D 1/184 |
| | | | 74/493 |
| 2022/0073126 A1* | 3/2022 | Geiger ................... | B62D 1/184 |
| 2023/0303151 A1* | 9/2023 | Shiroishi ................ | B62D 1/184 |

FOREIGN PATENT DOCUMENTS

| | | | | |
|---|---|---|---|---|
| JP | 7476121 B2 * | 4/2024 | ............ | B62D 1/184 |
| KR | 20140005096 A * | 1/2014 | | |
| KR | 10-1401432 | 5/2014 | | |
| KR | 10-2020-0126646 | 11/2020 | | |

* cited by examiner

STEERING APPARATUS AND METHOD OF OPERATING THE SAME

CROSS-REFERENCE TO RELATED APPLICATION

This application claims the benefit of Korean Patent Application No. 10-2023-0043110, filed on Mar. 31, 2023 in the Korean Intellectual Property Office, the disclosure of which is incorporated herein by reference.

BACKGROUND

1. Field

Embodiments of the present disclosure relate a steering apparatus and a method of operating the same, and more specifically, to a steering apparatus in which a telescope and tilt adjusting apparatus is improved to prevent an accident of a driver, and a method of operating the same.

2. Description of the Related Art

In general, a steering apparatus of a vehicle is an apparatus for changing a travel direction of the vehicle according to the intention of the driver and configured to assist the driver so that the vehicle travels in a direction required by the driver by intentionally changing a rotational center around which front wheels of the vehicle turn. In such a steering apparatus of the vehicle, a steering force generated when the driver operates a steering wheel is transmitted to a rack pinion mechanism through a steering shaft and finally changes a direction of two wheels.

In addition, the steering apparatus of the vehicle may additionally have a telescope or tilt function for the convenience of the driver, a telescopic apparatus is an apparatus for adjusting by extending and contracting in an axial direction, and a tilt apparatus is an apparatus for adjusting a fixing angle of the steering wheel.

The conventional tilt and telescopic steering apparatus includes an outer tube which accommodates a steering shaft, a bracket fixed to a vehicle body, an adjustment bolt which connects the bracket and the outer tube, and various components which allow tilt and telescopic of the outer tube to be controlled on the bracket.

In particular, an adjusting lever is used to control the telescopic operation and tilt operation of the steering apparatus. Specifically, when a position of the steering apparatus is adjusted, the adjusting lever is loosened, a position of the adjustment bolt is changed, and the adjusting lever is tightened.

However, since the driver manually holds and rotates the adjusting lever, a size and volume of the adjusting lever should be large. Accordingly, there are problems that a spatial efficiency in the vehicle is reduced because an operating space of the adjusting lever should be secured and, when the vehicle crashes, the driver's knees or the like are seriously injured.

Accordingly, there is a need for an apparatus of which a space can be efficiently used while performing a telescopic operation and a tilt operation of a steering apparatus and which can prevent damage to people and a method of operating the same.

RELATED ART

Patent Document

Korean Patent publication No. 10-2020-0126646 (Published on Nov. 9, 2020)

SUMMARY

Therefore, it is an aspect of the present disclosure to provide a steering apparatus in which a telescope and tilt adjusting apparatus does not protrude toward a driver so that damage to a person is prevented, and a method of operating the same.

It is another aspect of the present disclosure to provide a steering apparatus in which a telescope and tilt adjusting apparatus occupies a small volume to have high spatial efficiency and a method of operating the same.

It is still another aspect of the present disclosure to provide a steering apparatus in which a telescope and tilt adjusting apparatus is provided to be conveniently operated by a driver to improve the operational convenience and a method of operating the same.

In accordance with one aspect of the present disclosure, a steering apparatus includes a pair of plate brackets provided on two sides of an outer tube and including tilt long holes formed in a vertical direction, a cam unit coupled to an outer side of any one of the pair of plate brackets to apply a pressure inward, and an adjusting unit coupled to an outer surface of the cam unit to adjust rotation of the cam unit, wherein the adjusting unit includes a first spring installed outside the cam unit, a plunger of which one end is in contact with the first spring and the other end is provided with a push button, a stopper provided in a hollow shape through which the plunger passes, a position of the stopper is fixed to a vehicle body, a guide pin formed to protrude from an outer circumferential surface of the plunger, and a guide member provided in a hollow shape through which the plunger passes, fixed to an outer side of the stopper, and including a guide groove in which the guide pin is accommodated, and the guide groove includes a diagonal groove formed in a diagonal direction so that the guide pin moves to rotate the plunger.

The guide groove may include a fixing groove formed to extend from an end of the diagonal groove so that the guide pin is fixedly seated in the fixing groove when the plunger stopes rotation to allow the cam unit to apply a pressure inward.

The fixing groove may be formed to extend from the end of the diagonal groove in a direction away from the stopper, wherein the direction is different from a direction in which the diagonal groove is formed.

An outer diameter of the fixing groove may be equal to an outer diameter of the guide pin.

The guide groove may include a horizontal groove formed to extend from the end of the diagonal groove toward the stopper to be parallel to an axial direction of the plunger.

The plunger may include a support member formed on one end of the plunger in contact with the first spring and having an outer diameter greater than or equal to an outer diameter of the stopper.

The adjusting unit may include a thrust bearing interposed between the plunger and the cam unit.

The cam unit may include a fixed cam coupled to the outer side of the plate bracket and including a plurality of first protrusions formed on one surface of the fixed cam and an operating cam in which a plurality of second protrusions are formed on one side of the operating cam correspondingly in contact with the first protrusions and the first spring is coupled to the other side thereof.

The steering apparatus may include a gear unit coupled to an outer side of the other of the pair of plate brackets and configured to apply a pressure inward.

The gear unit may include a fixed gear coupled to the outer side of the plate bracket and including a plurality of first teeth formed on one surface of the fixed gear and an operating gear in which a plurality of second teeth are formed on one side of the operating gear correspondingly in contact with the first teeth and a fixing nut is coupled to the other side thereof.

The gear unit may include a second spring interposed between the operating gear and the fixing nut to provide an inward elastic force to the operating gear.

The steering apparatus may include an adjustment bolt which passes through the tilt long holes and of which one end is coupled to the cam unit and the other end is coupled to the gear unit.

The first spring may be provided as a plurality of first springs disposed in series.

The pair of plate brackets may include connecting members connecting upper ends of the pair of plate brackets to be integrally provided.

In accordance with another aspect of the present disclosure, a method of operating a steering apparatus, which includes a cam unit coupled to an outer side of any one a pair of plate brackets and configured to apply a pressure inward and an adjusting unit coupled to an outer surface of the cam unit to adjust rotation of the cam unit is provided, and the adjusting unit includes a first spring installed outside the cam unit and a plunger installed outside the first spring, the method including pressing the plunger inward by a push button provided on an end of the plunger and moving the plunger inward through a stopper of which a position is fixed to a vehicle body and a guide member fixed to an outer side of the stopper, moving a guide pin formed to protrude from an outer circumferential surface of the plunger along a guide groove formed in the guide member from an outer side to an inner side of a diagonal groove formed in a diagonal direction, rotating the plunger to rotate the cam unit so as to press the plate brackets inward, pressing the plunger inward by the push button provided on the end and then moving the plunger outward by receiving an elastic force of the first spring, moving the guide pin along the guide groove from the inside to the outside of the diagonal groove formed in the diagonal direction, and rotating the plunger to rotate the cam unit to release a pressure of the plate brackets pressed inward.

The guide groove may include a fixing groove formed to extend from an end of the diagonal groove so that the guide pin is fixedly seated in the fixing groove when the plunger ends rotation to allow the cam unit to apply the pressure inward, and, when the guide pin moves along the guide groove from the outer side to the inner side of the diagonal groove formed in the diagonal direction, the guide pin of which the movement ends may be fixedly seated in the fixing groove.

The guide groove may include a horizontal groove formed to extend from the end of the diagonal groove toward the stopper to be parallel to an axial direction of the plunger, and, when the cam unit is rotated to press the plate brackets inward and then pressed to an inside of the plunger by the push button, the guide pin may be moved from the fixing groove to at least a part of the horizontal groove and then receive an elastic force of the first spring to move outward.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
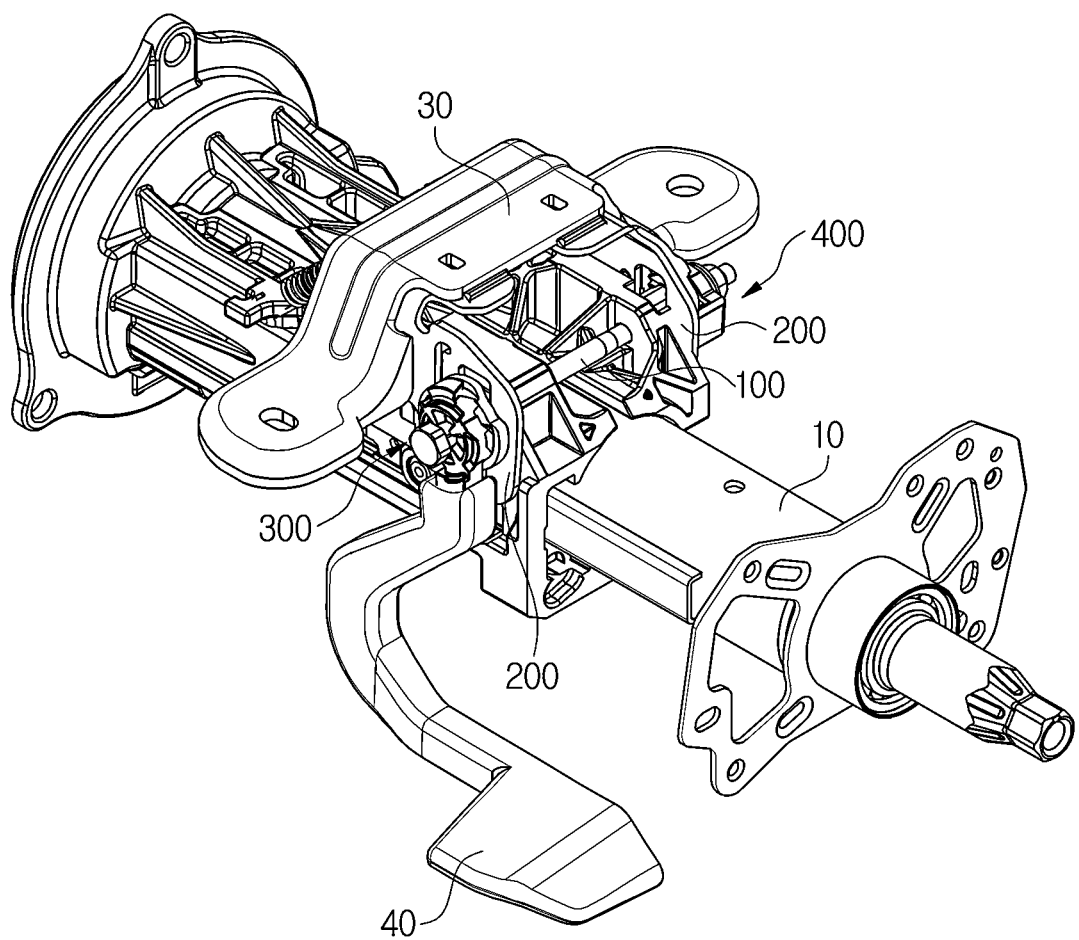
FIG. 1 is a perspective view illustrating an overall shape of a conventional steering apparatus.

Hereinafter, embodiments of the present disclosure will be described in detail with reference to the accompanying drawings. The following embodiments are provided to sufficiently convey the spirit of the present disclosure to those skilled in the art. The present disclosure is not limited to the embodiments disclosed herein and may be implemented in different forms. In the drawings, portions which are not related to the description may be omitted for clarifying the present disclosure, and sizes of components may be exaggerated for facilitating understanding of the present disclosure.

Figure 2:
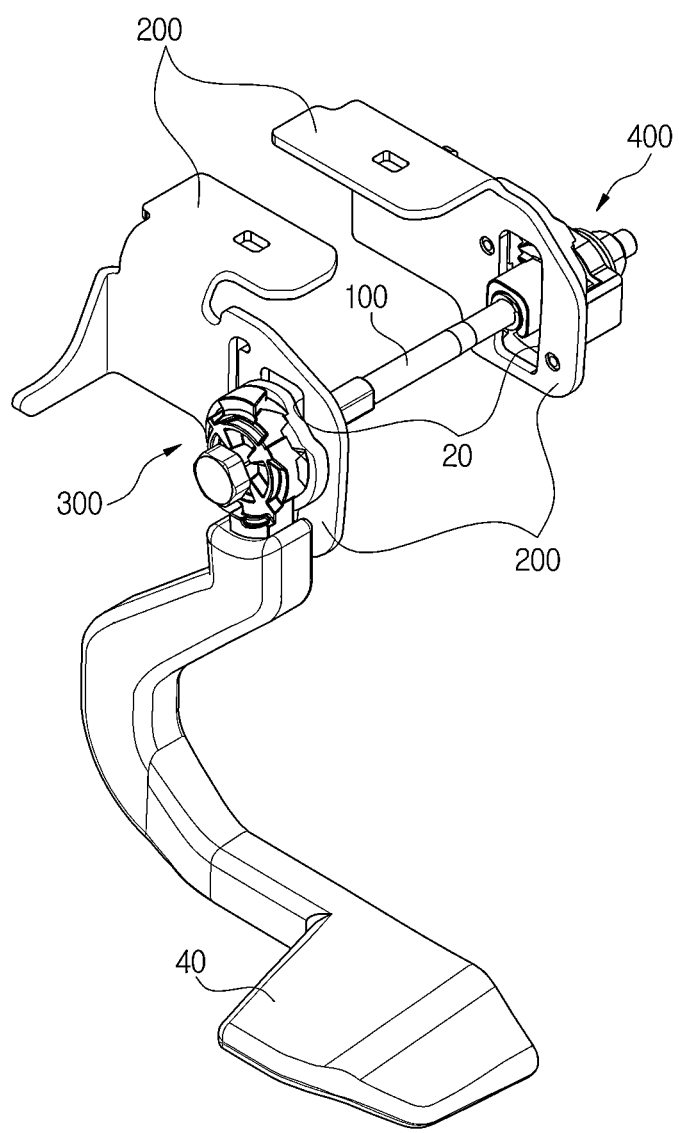
FIG. 2 is a perspective view illustrating a telescope and tilt adjusting apparatus of the conventional steering apparatus.

FIG. 1 is a perspective view illustrating an overall shape of a conventional steering apparatus, and FIG. 2 is a perspective view illustrating a telescope and tilt adjusting apparatus of the conventional steering apparatus.

Referring to FIGS. 1 and 2, the conventional steering apparatus is a steering apparatus capable of performing tilt and telescopic adjustment and includes an inner tube and an outer tube 10 which accommodate a steering shaft, a bracket fixed to a vehicle body, an adjustment bolt 100 which connects the bracket and the outer tube 10, and a cam unit 300, a gear unit 400, and an adjusting lever 40 which allow tilt and telescopic of the outer tube 10 to be controlled on the bracket.

The inner tube is formed in a hollow tube shape, and the steering shaft is inserted into the inner tube.

The outer tube 10 is formed in a hollow tube shape, and the inner tube is inserted into the outer tube 10.

Meanwhile, plate brackets 200 are provided at two sides of the outer tube 10. Each of the plate brackets 200 is formed in substantially a "∩" shape and surrounds an outer circumferential surface of the outer tube 10. In the plate brackets 200, tilt long holes 20 facing each other are formed, and the plate brackets 200 are coupled to a mounting bracket 30, and the mounting bracket 30 is coupled to the vehicle body. Each of the tilt long holes 20 is formed to extend in a vertical direction to allow tilt adjustment of the outer tube 10.

The cam unit 300 includes a fixed cam 310 and an operating cam 320. The fixed cam 310 is coupled to an outer side of any one of the plate brackets 200 and has a structure in which a plurality of protrusions are formed on one surface. Protrusions correspondingly in contact with the protrusions of the fixed cam 310 are formed on the operating cam 320.

An adjusting lever 40 is coupled to the operating cam 320 so that a driver may rotate the adjusting lever 40 to clamp or unclamp the steering apparatus. Specifically, the driver may rotate the adjusting lever 40 in one direction to clamp the steering apparatus in order to fix tilt or telescope of the steering apparatus. In this case, the protrusions of the operating cam 320 move along the protrusions of the fixed cam 310 to separate the operating cam 320 from the fixed cam 310, and the fixed cam 310 presses and tightens the plate bracket 200 inward to lock the steering apparatus.

Conversely, the driver may rotate the adjusting lever 40 in the other direction to unclamp the steering apparatus. In this case, the operating cam 320 and fixed cam 310, which have been separated, are returned to their original positions to widen a gap between the plate brackets 200, which are pressed and close to each other, to unlock the steering apparatus.

The gear unit 400 includes a fixed gear 410 and an operating gear 420. The fixed gear 410 is coupled to the other of the plate brackets 200 and has a structure in which a plurality of teeth are formed on one surface. Teeth correspondingly in contact with protrusions of the fixed gear 410 are formed on the operating gear 420.

The adjustment bolt 100 passes through the tilt long holes 20, the cam unit 300 is coupled to one end of the adjustment bolt 100, and the gear unit 400 is coupled to the other end thereof. Accordingly, the driver controls the cam unit 300 using the adjusting lever 40, the gear unit 400 is controlled through the adjustment bolt 100 according to operation of the cam unit 300, and thus the outer tube 10 is tightened to or loosened from the plate brackets 200.

As described above, the conventional steering apparatus includes the adjusting lever 40 as an adjusting apparatus for adjusting telescope and tilt. The adjusting lever 40 is formed to protrude toward the driver to facilitate operation of the driver to, generally, a space around which the driver's knees are positioned. Although the adjusting lever 40 improves the operational convenience of the driver, a size and volume of the adjusting lever 40 become large, the adjusting lever 40 occupies a space of the driver, and when a vehicle collision accident occurs, the adjusting lever 40 strikes the driver's knees and becomes a cause of damage to a person. Accordingly, the present invention provides a button-type adjusting apparatus which replaces the adjusting lever 40 in the telescope and tilt adjusting apparatus of the steering apparatus to solve the problems of the adjusting lever 40 and also improves the operational convenience of the adjusting apparatus.

Figure 3:
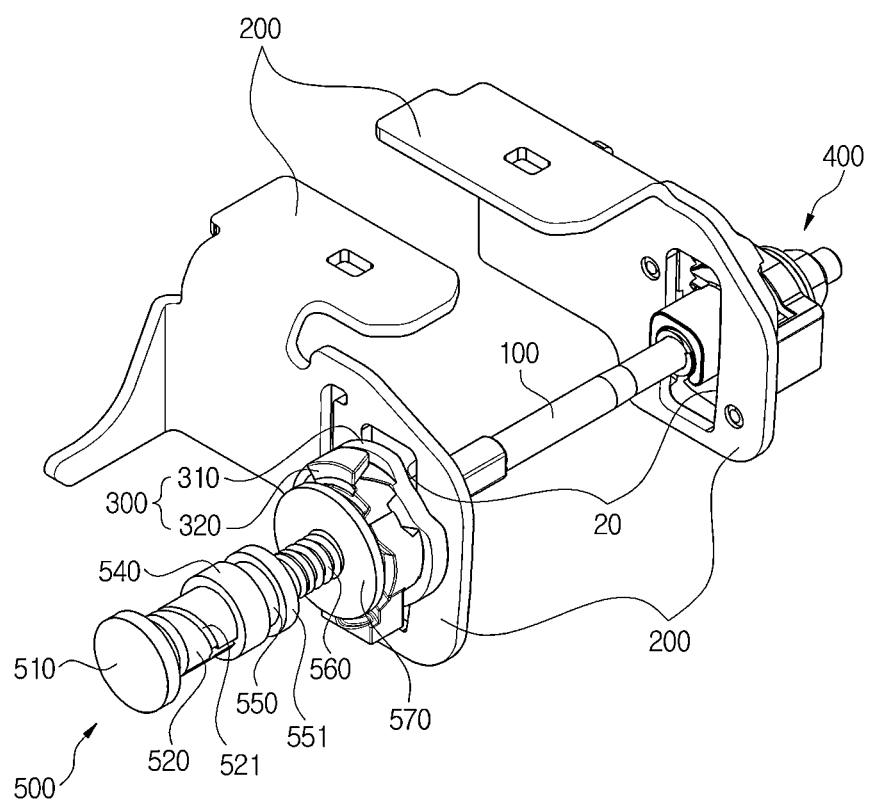
FIG. 3 is a perspective view illustrating a telescope and tilt adjusting apparatus of a steering apparatus according to an embodiment of the present invention.

FIG. 3 is a perspective view illustrating a telescope and tilt adjusting apparatus of a steering apparatus according to an embodiment of the present invention.

Referring to FIG. 3, the steering apparatus according to the embodiment of the present invention has the same configuration as the conventional steering apparatus and includes an adjusting unit 500 instead of the adjusting lever 40. The adjusting unit 500 is an apparatus which is coupled to an outer side of a cam unit 300 to adjust rotation of the cam unit 300 and includes a fixed cam 310, an operating cam 320, a thrust bearing 570, a first spring 560, a plunger 550, a stopper 540, a guide member 520, and a push button 510 which are sequentially disposed from the inside.

The fixed cam 310 is coupled to an outer side of one plate bracket 200 and has a plurality of first protrusions 311 formed on one surface of the fixed cam 310, the operating cam 320 has a plurality of second protrusions 321 formed on one side of the operating cam 320 correspondingly in contact with the first protrusions 311, and the first spring 560 is coupled to the other side thereof. An operating principle of the fixed cam 310 and the operating cam 320 which clamp or unclamp the steering apparatus will be described in detail below.

In the present disclosure, expressions such as "inward" and "outward" are used. As an example, there are expressions such as the plate bracket 200 pressed outward, the cam unit 300 applying a pressure inward, and the like. In this case, based on the adjusting apparatus of the steering apparatus, "inward" is a direction toward an outer tube 10, and "outward" is a direction opposite to the direction toward the outer tube 10. Hereinafter, the expressions such as "outward" and "inward" can be understood as described above.

The first spring 560 is installed outside the cam unit 300. The first spring 560 provides initial tension to support the plunger 550 by the plate bracket 200 and is rotated by the push button 510 to push the plunger 550 which moves in an axial direction to allow button operation. The first spring 560 may be provided as one first spring 560 or a plurality of first springs 560 disposed in series.

A thrust bearing 570 is interposed between the plunger 550 and the cam unit 300. Specifically, the thrust bearing 570 is disposed between the plunger 550 and the cam unit 300 and includes an opening, through which the first spring 560 passes, in a center thereof. Accordingly, the rotational operation of the first spring 560 according to rotation of the plunger 550 can be supported.

The plunger 550 is provided in a cylindrical shape, one end of the plunger 550 is in contact with the first spring 560, and the push button 510 is provided on the other end thereof. The push button 510 may be a button pushed by a driver in the axial direction of the plunger 550 to move the plunger 550 and may have a greater diameter than the plunger 550 to facilitate operation of the driver.

A position of the stopper 540 is fixed to a vehicle body. The stopper 540 is provided in a hollow shape through which the plunger 550 passes and is disposed in a center of the plunger 550.

The plunger 550 includes a support member 551 having an outer diameter greater than or equal to an outer diameter of the stopper 540 at one end of the plunger 550 in contact with the first spring 560. Accordingly, the plunger 550 maintains a state in which one surface of the support member 551 is in contact with the stopper 540, and when the driver presses the plunger 550 inward using the push button 510, one surface of the support member 551 is separated from the stopper 540, and thus the plunger 550 moves inward.

The guide member 520 is formed in a hollow shape through which the plunger 550 passes and fixed to an outer side of the stopper 540.

The plunger 550 includes a guide pin 530 formed to protrude from an outer circumferential surface of the plunger 550, and a guide groove 521 which accommodates the guide pin 530 is formed in the guide member 520. In this case, the guide groove 521 is not formed only in a horizontal direction and includes a diagonal groove 521a which is formed in a diagonal direction so that the guide pin 530 moves to rotate the plunger 550.

The guide groove 521 may further include a fixing groove 521b and a horizontal groove 521c in addition to the diagonal groove 521a. The fixing groove 521b is formed to extend from an end of the diagonal groove 521a so that the guide pin 530 is fixedly seated in the fixing groove 521b when the plunger 550 ends rotation to allow the cam unit 300 to apply a pressure inward. Specifically, the fixing groove 521b may be formed to extend from the end of the diagonal groove 521a in a direction away from the stopper 540, the direction is different from a direction in which the diagonal groove 521a is formed, and an outer diameter of the fixing groove 521b may be equal to an outer diameter of the guide pin 530.

The horizontal groove 521c may be formed to extend from the end of the diagonal groove 521a toward the stopper 540 and formed parallel to the axial direction of the plunger 550.

An operation principle, in which the guide pin 530 moves in the guide groove 521 including the diagonal groove 521a, the fixing groove 521b, and the horizontal groove 521c and the plunger 550 rotates, will be described in detail below.

A pair of plate brackets 200 each having a "]" shape are provided to face each other, and an overall shape of the pair of plate brackets 200 is substantially a "∩" shape. In this case, the pair of plate brackets 200 may include connecting members (e.g. the mounting bracket 30) connecting upper ends of the pair of plate brackets 200 so that the pair of plate brackets 200 may be integrally provided.

Figure 4:
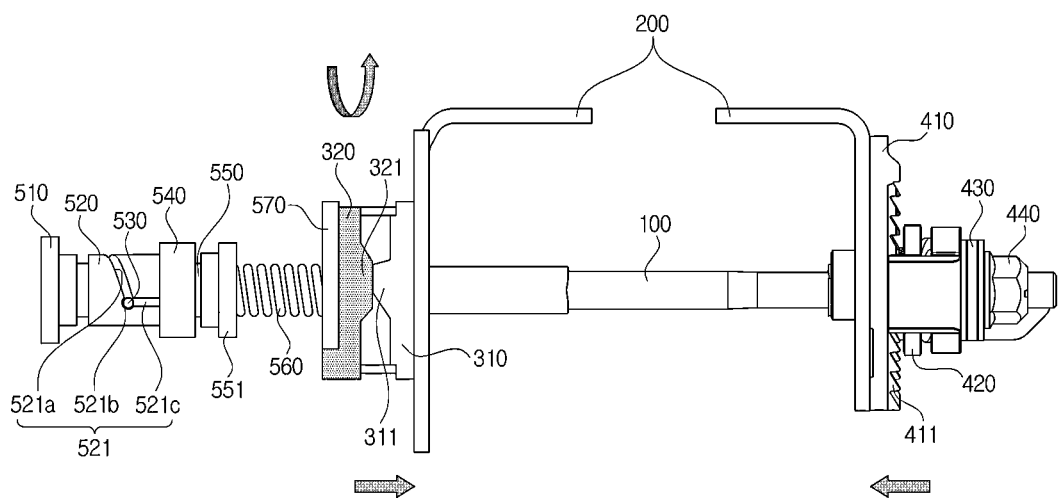
FIG. 4 is a perspective view illustrating a state in which the telescope and tilt adjusting apparatus of the steering apparatus according to the embodiment of the present invention is loosened.
Figure 5:
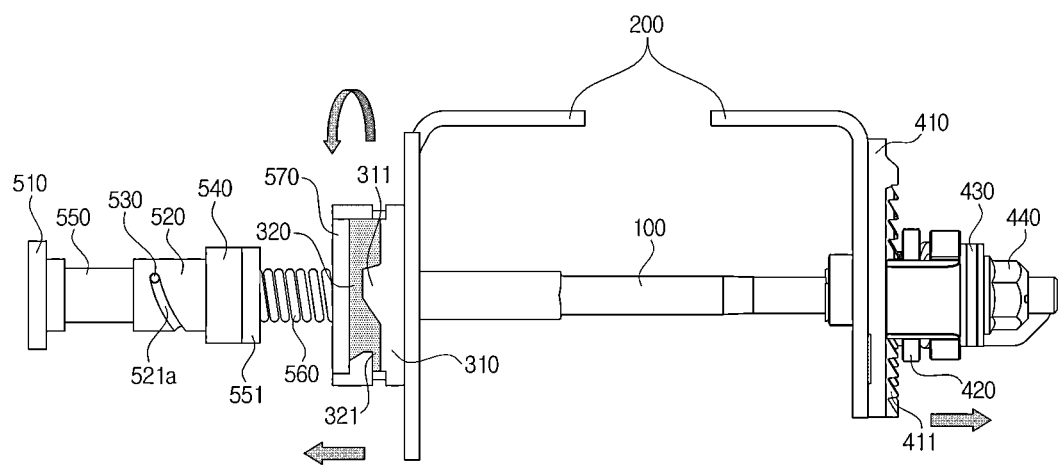
FIG. 5 is a perspective view illustrating a state in which the telescope and tilt adjusting apparatus of the steering apparatus according to the embodiment of the present invention is tightened.

The gear unit 400 may be coupled to an outer side of the other of the pair of plate brackets 200 and may apply a pressure inward. Referring to FIGS. 4 and 5, the gear unit 400 may include a fixed gear 410, an operating gear 420, a bearing 430, and a fixing nut 440.

The fixed gear 410 is coupled to the outer side of the plate bracket 200 and may have a plurality of first teeth 411 formed on one surface of the fixed gear 410 in a vertical direction, and the operating gear 420 may have a plurality of second teeth (not shown) formed on one side of the operating gear 420 correspondingly in contact with the first teeth 411, and the fixing nut 440 may be coupled to the other side thereof.

The bearing 430 may be provided between the operating gear 420 and the fixing nut 440 and may further include a second spring (not shown) interposed between the operating gear 420 and the fixing nut 440 to provide an inward elastic force to the operating gear 420.

Accordingly, the gear unit 400 may press the plate bracket 200 inward to tighten the plate bracket 200 or release the tightening using the adjustment bolt 100 according to operation of the cam unit 300. When the tightening is released, tilt of the steering apparatus may be determined by adjusting a fastening position of the first teeth 411 and the second teeth (not shown), and may perform tightening again after the determination is completed.

Hereinafter, a method of operating the steering apparatus according to the embodiment of the present invention will be described.

FIG. 4 is a perspective view illustrating a state in which the telescope and tilt adjusting apparatus of the steering apparatus according to the embodiment of the present invention is loosened, and FIG. 5 is a perspective view illustrating a state in which the telescope and tilt adjusting apparatus of the steering apparatus according to the embodiment of the present invention is tightened.

Referring to FIG. 4, a process of locking and clamping the steering apparatus according to the embodiment of the present invention may be seen.

When the driver presses the push button 510 provided on an end of the plunger 550 inward, the plunger 550 is pressed and moved inward through the stopper 540, of which the position is fixed to the vehicle body, and the guide member 520, which is fixed to the outer side of the stopper 540.

In this case, the guide pin 530 formed to protrude from the outer circumferential surface of the plunger 550 moves along the guide groove 521 formed in the guide member 520 from an outer side to an inner side of the diagonal groove 521a formed in the diagonal direction, and thus the plunger 550 is rotated.

In this case, the operating cam 320 of the cam unit 300 rotates, and the first protrusions 311 provided on the operating cam 320 move on the second protrusions 321 provided on the fixed cam 310. That is, the operating cam 320 is rotated due to the rotation of the plunger 550, the fixed cam 310 is spaced a certain distance from the operating cam 320, and the fixed cam 310 presses the plate bracket 200 inward as much as the spaced distance.

In this case, the guide groove 521 may include the fixing groove 521b formed to extend from the end of the diagonal groove 521a. In this case, when the plunger 550 ends the rotation to allow the cam unit 300 to apply a pressure inward, the guide pin 530 may stop movement from the outer side to the inner side of the diagonal groove 521a and may be seated in the fixing groove 521b. The fixing groove 521b may be formed in a direction different from the direction in which the diagonal groove 521a is formed and may have the outer diameter equal to the outer diameter of the guide pin 530, and thus the guide pin 530 may be fixedly and elastically supported by the first spring 560 in an outward direction after seated in the fixing groove 521b.

Referring to FIG. 5, a process of unlocking and unclamping the steering apparatus according to the embodiment of the present invention may be seen.

In a state in which the steering apparatus clamped, when the driver presses the push button 510 provided on the end of the plunger 550 inward, the plunger 550 receives an elastic force of the first spring 560 to move outward. That is, the guide pin 530 moves along the guide groove 521 from the inner side to the outer side of the diagonal groove 521a formed in the diagonal direction, and the plunger 550 rotates to rotate the cam unit 300 to release a pressure of the plate bracket 200 pressed inward.

In this case, the horizontal groove 521c formed to extend from the end of the diagonal groove 521a toward the stopper 540 to be parallel to the axial direction of the plunger 550 may be provided. In this case, the guide pin 530 may move from the fixing groove 521b to at least a part of the horizontal groove 521c and then receive an elastic force of the first spring 560 to move outward along the diagonal groove 521a.

When the plunger 550 is rotated in one direction by an external force applied by the driver to lock the steering apparatus, the guide pin 530 moves from the outer side to the inner side of the diagonal groove 521a and then seated in the fixing groove 521b disposed on an extension line of the one direction, and when the plunger 550 is rotated in the other direction by an elastic force of the first spring 560 after an external force is applied by the driver to unlock the steering apparatus, the guide pin 530 moves from the inner side to the outer side of the horizontal groove 521c and then moves to the diagonal groove 521a on an extension line of the other direction.

A force of the driver who directly rotates the adjusting lever 40 is replaced with an elastic recovery force of the first spring 560 generated after the driver presses and deforms the plunger 550 inward. Accordingly, an unclamping force is replaced. Accordingly, a design for a spring, which provides a compression distance of the spring according to a force applied by a driver and an appropriate elastic recovery force according to the compression distance, is required. As an example, when it is assumed that a spring applies a pretension force of 5000 N and has a compression distance of 4 mm, a spring constant may be designed to have 1250 N/mm. However, a spring constant may have any value according to a compression distance, a diameter and a thickness of a spring, and the like.

The steering apparatus according to the embodiment of the present invention having such a configuration includes the adjusting unit 500 which replaces the adjusting lever 40 formed to protrude toward the driver, and in the adjusting unit 500, the push button 510, the guide member 520, the guide pin 530, the stopper 540, the plunger 550, and the first spring 560 are formed parallel to the axial direction of the plunger 550. Accordingly, damage to a person, specifically to a knee portion caused by the adjusting lever 40 when a vehicle collision accident occurs can be prevented. In addition, since tilt and telescope of the steering apparatus can be adjusted by only pressing the push button 510, the operational convenience can be improved, and since a size and volume of the adjusting apparatus are reduced, a space in the vehicle can be used efficiently. The safety of the driver can be improved, the space in the vehicle can be variously and comfortably used, and thus the marketability of the vehicle can also be improved.

The present embodiment provides a steering apparatus in which a telescope and tilt adjusting apparatus does not protrude toward a driver so that damage to a person is prevented, and a method of operating the same.

The present embodiment provides a steering apparatus in which a telescope and tilt adjusting apparatus occupies a small volume to have high spatial efficiency and a method of operating the same.

The present embodiment provides a steering apparatus in which a telescope and tilt adjusting apparatus is provided to be conveniently operated by a driver to improve the operational convenience and a method of operating the same.

What is claimed is:

1. A steering apparatus comprising:
   a pair of plate brackets provided on two sides of an outer tube and including tilt long holes formed in a vertical direction;
   a cam unit coupled to an outer side of one plate bracket of the pair of plate brackets to apply a pressure inward; and
   an adjusting unit coupled to an outer surface of the cam unit to adjust rotation of the cam unit,
   wherein the adjusting unit includes a first spring installed outside the cam unit,
   a plunger of which one end is in contact with the first spring and the other end is provided with a push button,
   a stopper provided in a hollow shape through which the plunger passes,
   a guide pin formed to protrude from an outer circumferential surface of the plunger, and
   a guide member provided in a hollow shape through which the plunger passes, fixed to an outer side of the stopper, and including a guide groove in which the guide pin is accommodated, and
   the guide groove includes a diagonal groove formed in a diagonal direction so that the guide pin moves to rotate the plunger.

2. The steering apparatus of claim 1, wherein the guide groove includes a fixing groove formed to extend from an end of the diagonal groove so that the guide pin is fixedly seated in the fixing groove when the plunger stops rotation to allow the cam unit to apply a pressure inward.

3. The steering apparatus of claim 2, wherein the fixing groove is formed to extend from the end of the diagonal groove in a direction away from the stopper, wherein the direction is different from a direction in which the diagonal groove is formed.

4. The steering apparatus of claim 3, wherein the guide groove includes a horizontal groove formed to extend from the end of the diagonal groove toward the stopper to be parallel to an axial direction of the plunger.

5. The steering apparatus of claim 2, wherein an outer diameter of the fixing groove is equal to an outer diameter of the guide pin.

6. The steering apparatus of claim 1, wherein the plunger includes a support member formed on one end of the plunger in contact with the first spring and having an outer diameter greater than or equal to an outer diameter of the stopper.

7. The steering apparatus of claim 1, wherein the adjusting unit includes a thrust bearing interposed between the plunger and the cam unit.

8. The steering apparatus of claim 1, wherein the cam unit includes:
   a fixed cam coupled to the outer side of the one plate bracket and including a plurality of first protrusions formed on one surface of the fixed cam; and
   an operating cam in which a plurality of second protrusions are formed on one side of the operating cam correspondingly in contact with the first protrusions and the first spring is coupled to the other side of the operating cam.

9. The steering apparatus of claim 8, wherein:
   the adjusting unit includes a thrust bearing interposed between the plunger and the cam unit; and
   the thrust bearing includes an opening through which the first spring passes.

10. The steering apparatus of claim 1, comprising a gear unit coupled to an outer side of another plate bracket of the pair of plate brackets and configured to apply a pressure inward.

11. The steering apparatus of claim 10, wherein the gear unit includes:
    a fixed gear coupled to the outer side of the another plate bracket and including a plurality of first teeth formed on one surface of the fixed gear; and
    an operating gear in which a fixing nut is coupled to the operating gear.

12. The steering apparatus of claim 10, comprising an adjustment bolt which passes through the tilt long holes and of which one end is coupled to the cam unit and the other end is coupled to the gear unit.

13. A method of operating a steering apparatus, which includes a cam unit coupled to an outer side of one plate bracket of a pair of plate brackets and configured to apply a pressure inward and an adjusting unit coupled to an outer surface of the cam unit to adjust rotation of the cam unit, and the adjusting unit includes a first spring installed outside the cam unit and a plunger installed outside the first spring, the method comprising:
    pressing the plunger inward by a push button provided on an end of the plunger and moving the plunger inward through a stopper, wherein a guide member is fixed to an outer side of the stopper;
    moving a guide pin formed to protrude from an outer circumferential surface of the plunger along a guide groove formed in the guide member from an outer side to an inner side of a diagonal groove formed in a diagonal direction;

rotating the plunger to rotate the cam unit so as to press the pair of plate brackets inward;

pressing the plunger inward by the push button provided on the end and then moving the plunger outward by receiving an elastic force of the first spring;

moving the guide pin along the guide groove from the inside to the outside of the diagonal groove formed in the diagonal direction; and rotating the plunger to rotate the cam unit to release a pressure of the pair of plate brackets pressed inward.

14. The method of claim 13, wherein:

the guide groove includes a fixing groove formed to extend from an end of the diagonal groove so that the guide pin is fixedly seated in the fixing groove when the plunger ends rotation to allow the cam unit to apply the pressure inward; and when the guide pin moves along the guide groove from the outer side to the inner side of the diagonal groove formed in the diagonal direction, the guide pin of which the movement ends is fixedly seated in the fixing groove.

15. The method of claim 14 wherein:

the guide groove includes a horizontal groove formed to extend from the end of the diagonal groove toward the stopper to be parallel to an axial direction of the plunger; and when the cam unit is rotated to press the pair of plate brackets inward and then pressed to an inside of the plunger by the push button, the guide pin is moved from the fixing groove to at least a part of the horizontal groove and then receives an elastic force of the first spring to move outward.

* * * * *